United States Patent [19]

Comer et al.

[11] 4,282,653
[45] Aug. 11, 1981

[54] CUTTING ELEMENT FOR VEGETATION LINE TRIMMERS

[75] Inventors: Robert C. Comer, Hopkins; Henry B. Tillotson, Minneapolis, both of Minn.

[73] Assignee: The Toro Company, Minneapolis, Minn.

[21] Appl. No.: 3,242

[22] Filed: Jan. 15, 1979

[51] Int. Cl.³ .............................................. A01D 50/00
[52] U.S. Cl. .................................... 30/276; 56/12.7; 56/1
[58] Field of Search .................. 30/276, 347; 56/12.7, 56/295

[56] References Cited

U.S. PATENT DOCUMENTS

| | | | |
|---|---|---|---|
| 2,663,137 | 12/1953 | Asbury | 56/12.7 |
| 2,984,053 | 5/1961 | Peterson | 15/198 X |
| 3,708,967 | 1/1973 | Geist et al. | 56/12.7 |
| 4,024,635 | 5/1977 | Mizuno et al. | 56/12.7 X |
| 4,062,115 | 12/1977 | Lee | 30/276 |
| 4,137,694 | 2/1979 | Hopper | 56/12.7 |
| 4,186,239 | 1/1980 | Mize | 56/12.7 |

*Primary Examiner*—Jimmy C. Peters
*Attorney, Agent, or Firm*—James W. Miller

[57] ABSTRACT

A discrete cutting element (18) including a plurality of cutting filaments (26) for use in a vegetation line trimmer (10). In a preferred embodiment provided filaments (26) emanate from a common locus (27) at a filament holder (16) for rotation about the holder's axis of rotation. Certain embodiments can include axially fixed apparatus for conducting the associated filaments (26) away from a spool-like member (23) around which the filaments (26) are wound, and aiding divergence of the filaments.

11 Claims, 8 Drawing Figures

CUTTING ELEMENT FOR VEGETATION LINE TRIMMERS

TECHNICAL FIELD

The invention of this application is related to the field of vegetation line trimmers. More specifically, it is directed to the technology of flexible filament cutting assemblies used in such trimmers.

BACKGROUND OF THE PRIOR ART

Various types of line trimmers are presently known and are being marketed in the vegetation cutting art. These trimmers generally include a handle or other means by which the device can be transported and guided during use. Mounted to the handle, near one end thereof, is a cutting head. The cutting head typically includes a protective shield having mounted therein a filament holder which can be made to rotate about a substantially vertical axis.

Line trimmers known in the art often use one flexible filament cutting element extending from the filament holder generally radially with respect to the axis about which the filament holder rotates. When the filament holder is made to rotate about its axis of rotation, the filament cutting element generally defines a plane perpendicular to the axis of rotation. Heavier duty line trimmers sometimes incorporate a plurality of single filament cutting elements, individual elements being positioned at equal angular distances about the filament holder. When such additional filament cutting elements are utilized, all cutting elements tend to rotate about the filament holder's axis of rotation in the same plane.

It is also known to coil a length of filament about the filament holder so that, as that portion of the filament length being used for trimming becomes worn, a new length may be metered out. This metering operation can be accomplished in devices utilizing multiple angularly spaced cutting elements.

Typically, filaments having a cross-sectional diameter of approximately 0.090 inches are currently used in line trimmers. It has been recognized that, by reducing the filament's diameter yet maintaining a speed of rotation of the filament the same as that at which a 0.090 inch filament is made to rotate, the cutting effectiveness of the element can be improved. This is true since, by reducing the area over which a constant force is applied, the amount of force per unit area is increased. The effectiveness of a thinner cutting element is greater than one having a larger cross-sectional diameter for the same reason that a sharp knife is more efficient than a dull one. Application of a certain force to the sharp blade will be distributed over the area of the cutting edge so that the force per unit area is greater than it would be if the knife were dull.

Another disadvantage of cutting elements using single filaments of approximately 0.090 inches in diameter as opposed to smaller filaments is that when they break off in operation, they tend to be more noticeable on a ground surface as debris.

Despite this, it has been thought less than optimum, however, to reduce the diameter of the cutting filament below 0.060 inches. This belief is based on the conclusion that to do so would decrease the strength of the filament and, commensurately, permit increased frequency of filament deterioration.

The invention of this application is intended to overcome the above shortcomings by providing a cutting element with a high force per unit area to cut grass sharply and effectively without as much bruising as is typical with larger cutting elements, yet to provide a cutting element which is less noticeable as debris on a lawn surface when breakage of the filament occurs. Further, it is intended to provide these advantages without significantly increased frequency of cutting element replacement.

BRIEF SUMMARY OF THE INVENTION

The invention of the present application is a discrete cutting element which includes a plurality of associated cutting filaments. The filaments emanate from a common restricted location at a filament holder at which source ends of the filaments are mounted. The filaments are centrifugally caused to extend from the filament holder when the holder is made to rotate about its axis.

Particularly in embodiments in which the filament holder includes a spool-like member about which the associated filaments are wound, the invention may include a hub-type directing support radially spaced from, and enclosing, the spool-like member. An axially fixed conducting means, such as an aperture, formed in the support can be provided to limit the swing of the cutting element to a generally axially fixed cutting path. Use of a plurality of apertures may be made in conducting the multiple filaments through the directing support. Incorporation of multiple filaments will serve to broaden the cutting path defined as they rotate about the axis of rotation.

The invention can also include means for integrating the filaments into a unitary cable. In embodiments in which the filaments are wound about a spool-like member, use of such an integrating means aids in preventing entangling of the filament on the spool.

The invention of this application thus is an improved cutting element for use in vegetation line trimmers. The advantages of the invention will become apparent with reference to the accompanying drawings, detailed description of the invention, and claims.

DETAILED DESCRIPTION OF THE INVENTION

Figures 1, 2:
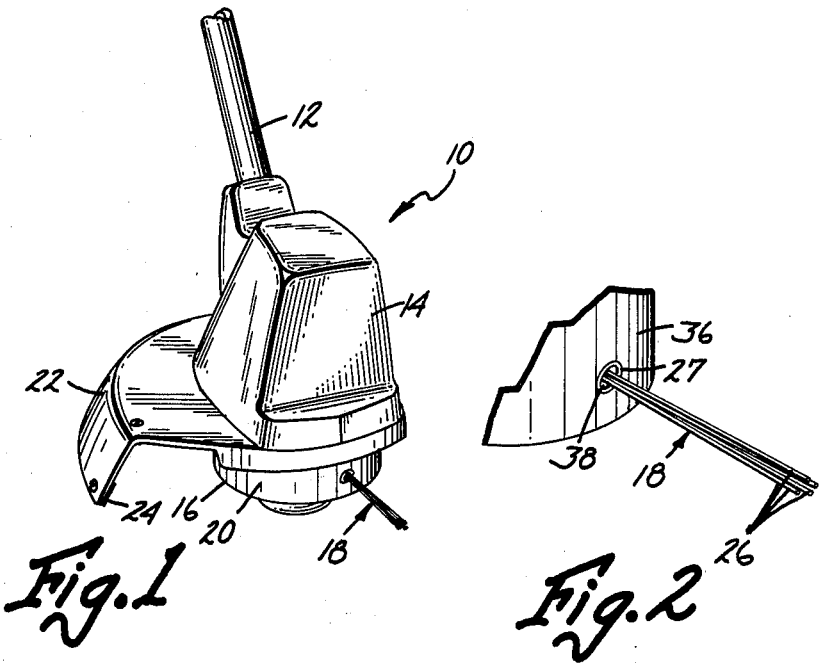
FIG. 1 is a view in perspective of the head end of a vegetation line trimmer embodying the invention of this application.
FIG. 2 is a fragmentary perspective view of a directing support through which a multiple filament cutting element extends.
Figure 6:
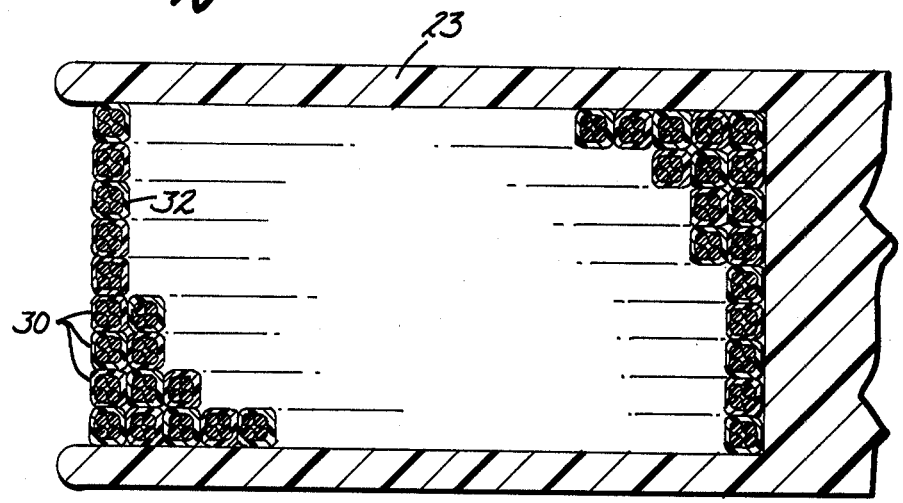
FIG. 6 is an enlarged fragmentary view, in section, of a spool-type filament holder which can be used in one embodiment of the invention.

Referring to the drawings, wherein like reference numerals denote like elements throughout the several views, FIG. 1 shows, in perspective, the head end of a vegetation line trimmer, shown generally at 10, similar to the type known in the art. Such line trimmers typically include a handle, a fragment of which is identified by the numeral 12, a housing 14 enclosing a motor (not shown) which drives a filament holder 16, a filament cutting element 18 extending generally radially from the filament holder 16, a hub support 20 through which the filament cutting element 18 passes, and a shield 22 which serves as deflector of cut vegetation particles. Attachment of the cutting element 18 to the filament holder 16 may be accomplished by one of a number of methods. One method would permanently attach the source end of the element to the holder without permitting any metering out of new filament should the used portion of the element 18 become worn through use. More typically, however, means for metering out new cutting element segments are provided. Commonly, a length of filament is wound about a spool-like element 23 as shown in FIG. 6. In such an embodiment, means can be included for permitting metering out of a new cutting length as filament deteriorates. In such embodiments, a cutting blade 24 can be attached to the shield 22 so that, as a new working length is metered out, the cutting element 18 is cut to the proper working length as it rotates about its axis of rotation and engages the sharp edge of the cutting blade 24.

FIG. 2 illustrates one embodiment of the invention in which a discrete cutting element 18 including a plurality of associated cutting filaments 26 is utilized. The embodiment shown utilizes four separate filaments 26 each of which is circular in cross-section, and has the same cross-sectional diameter. The scope of applicants' invention, however, is by no means limited to the specific quantity of filaments illustrated nor such a filament sizing.

The plurality of associated filaments 26 extends from a filament support hub 20 with their source ends emanating from a common situs 27 at the filament holder. By common situs, applicants mean a restricted location at the filament holder 16 at which filaments 26 are constrained proximate one another and significant divergence is precluded.

Although the invention contemplates embodiments other than one in which a length of filament is wound about a spool-like element, FIG. 6 illustrates a portion of spool 23 which might be used in such an embodiment. It will be understood that, although only the innermost and outermost layers of the coil of filament are shown in FIG. 6, windings of the filaments 26 will be continuous extending outward as filament is wound around the spool 23.

In embodiments in which the plurality of associated filaments are wound, as a unit, about the spool-like element 23, the invention can include a means for integrating and maintaining the filaments 26 as a unitary cable 30 on the spool 23. Such a characteristic is desirable in order to preclude tangling of filament portions on the spool 23 which might impede any metering out operation. The integrating means illustrated in FIG. 6 is a thin membrane 32 which sheaths the associated filaments while they are wound on the spool 23. For purposes of illustration, the membrane 32 is shown larger than scale. The membrane 32 is made of a thickness to ensure encasement and retention together of the associated filaments 26 while on the spool 23, yet thin enough to break away and effectively disintegrate almost immediately as the cutting element 18 engages blades of grass or debris to be reduced. As the membrane 32 breaks away, the unitary aspect of the cutting element is eliminated, and the plurality of separate filaments is present for cutting usage.

Experimentation has disclosed that membranes constructed of plastic and having a thickness less than 10 mils will most efficiently perform this dual function. The invention is not, however, restricted to membranes below a 10 mil thickness.

Figure 7:
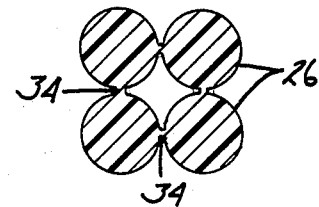
FIGS. 7 and 8 are enlarged cross-sectional views of discrete cutting elements.
Figure 8:
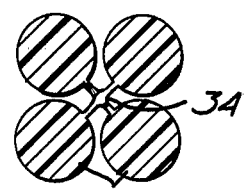

Other means for integrating and maintaining the filaments 26 as a unitary cable can be used. They can be wound on the spool 16 joined together at interfacing surfaces by some form of adhesive material 34. The material is preferably of a nature so that it fractures and allows the associated filaments 26 to separate as the cutting element 18 engages the grass or other debris to be cut. FIGS. 7 and 8 illustrate two orientations of membraneous-type, fracturable material 34 which can be used for this purpose.

Referring again to FIG. 2 and FIGS. 3, 4, and 5, cutting elements 18 whose component filaments 26 have an aggregate cross-sectional area approximating the cross-sectional area of a single filament with a cross-sectional diameter of 0.060 inches can be incorporated in the invention. Typically, cutting elements used in vegetation line trimmers known in the art comprise a single filament with a cross-sectional diameter of 0.090 inches. Although it has been recognized that reducing the cross-sectional diameter of the filament will effect an increase in force per unit area if a constant force is applied to the filament, and commensurately increase the cutting effectiveness of the cutting element, it has been thought that a reduction of the cross-sectional diameter below 0.060 inches would allow frequent fracturing of the filament and, therefore, be counterproductive. By including a plurality of filaments whose aggregate cross-sectional area approximates the cross-sectional area of a single filament having a 0.060 inch cross-sectional diameter, the cutting element of the present application can be integrated with vegetation line trimmers currently used and be compatible with their power characteristics.

FIGS. 2 through 5 show a portion of various directing supports 36 which are spaced radially from the axis about which the plurality of filaments rotates. The directing supports 36 shown comprise generally cylindrical walls which correspond in function to the hub support 20 shown in FIG. 1. Formed in the wall of the support 36 are filament conducting means. The filament conducting means shown in FIG. 2 is a unitary generally circular aperture 38 through which the plurality of associated cutting filaments 26 extends as a unit. The conducting means shown in FIGS. 3 through 5 each comprise a plurality of proximately located apertures 40, 42 and 44 respectively arranged in various orientations. Regardless of the conducting means incorporated, however, the means is preferably fixed axially with respect to the axis of rotation of the cutting element.

A significant advantage of the present invention is the fact that the plurality of filaments 26 forming a discrete cutting element 18 will diverge and define a cutting path which is not planar but rather has a measure of breadth. This breadth aspect will afford particlization of grass blades in addition to severing them from the ground.

Figures 3, 4:
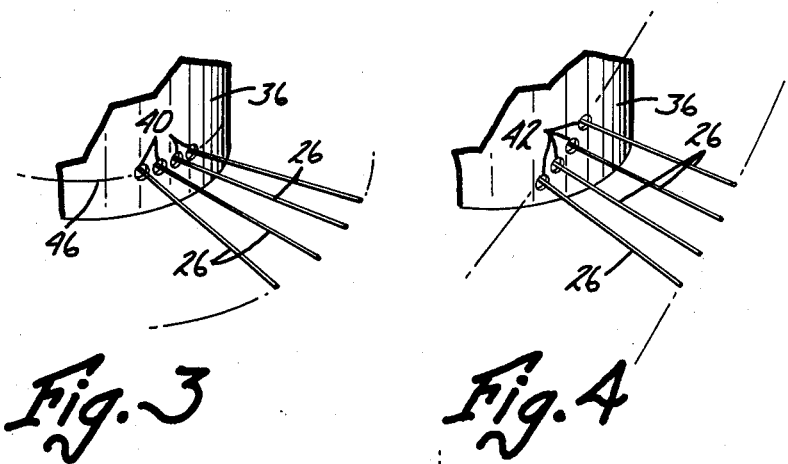
FIGS. 3, 4 and 5 are views similar to FIG. 2 illustrating different conducting aperture configurations.
Figure 5:
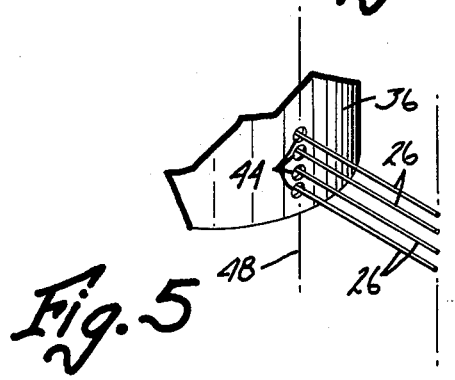

Experimentation has disclosed that the associated filaments 26 will often tend to diverge with respect to one another during use even when the filament conducting means utilized is a unitary aperture 38 as shown in FIG. 2. The plurality of apertures 40, 42 or 44 illustrated in FIGS. 3, 4 and 5 will, of course, insure a measure of divergence. A number of different spacings and configurations of the apertures other than those shown can be used. In FIG. 3, a line 46 defined by the centers of apertures 40 is oriented perpendicular to the axis about which the filaments rotate. In FIG. 5 a line 48 defined by the centers of the apertures is oriented substantially parallel to the axis of rotation. An oblique orientation, as shown in FIG. 4, has aspects of both repetition of cut, as in the embodiment shown in FIG. 3, and vertical divergence, as in the embodiment shown in FIG. 5.

Numerous characteristics and advantages of the invention have been set forth in the foregoing description. Although the invention has been described above in terms of specific embodiments and preferred constructions, it will, of course, be understood that the invention is defined in the appended claims, and many alternatives and modifications within the spirit and scope of the invention as defined by these claims will occur to those of skill in the art.

What is claimed is:

1. A cutting assembly for use in a vegetation line trimmer, comprising:
    a filament holder mounted to the vegetation line trimmer for rotation about an axis; and
    a plurality of associated cutting filaments the free ends of which emanate from a common situs at the outer surface of said filament holder, said plurality of filaments disposed for radial extension from said outer surface when said filament holder is made to rotate about said axis.

2. The cutting assembly of claim 1 wherein each of said plurality of associated filaments is circular in cross-section, each having substantially the same cross-sectional diameter.

3. The cutting assembly of claim 2 wherein the aggregate cross-sectional area of said plurality of associated filaments approximates the cross-sectional area of a single filament having a cross-sectional diameter of substantially 0.060 inches.

4. In a vegetation line trimmer of the type in which a line cutting element is mounted for rotation about an axis to define a cutting path, an improved cutting assembly, comprising a cutting element having a plurality of associated discrete cutting filaments, source ends of each of said filaments extending radially from a common angular locus spaced from said axis, to cooperate with one another in operation in the cutting of vegetation.

5. The cutting assembly of claim 4 further comprising a directing support, spaced radially from the axis of rotation, by which said common locus is defined.

6. The cutting assembly of claim 5 wherein said directing support comprises a generally cylindrical wall having formed therein filament conducting means fixed axially with respect to the axis of rotation of the cutting element.

7. The cutting assembly of claim 6 wherein said filament conducting means comprises a unitary aperture through which said plurality of associated cutting filaments extend.

8. The cutting assembly of claim 6 wherein said filament conducting means comprises a plurality of proximately located apertures formed in said wall at spaced intervals from one another, each of said filaments extending through one of said apertures.

9. The cutting assembly of claim 8 wherein a line defined by the centers of said apertures is oriented perpendicular to the axis about which said filaments rotate.

10. The cutting assembly of claim 8 wherein a line defined by the centers of said apertures is oriented substantially parallel to the axis about which said filaments rotate.

11. The cutting assembly of claim 8 wherein a line defined by the centers of said apertures is oriented oblique with respect to the axis about which said filaments rotate.

* * * * *